Figure 1:
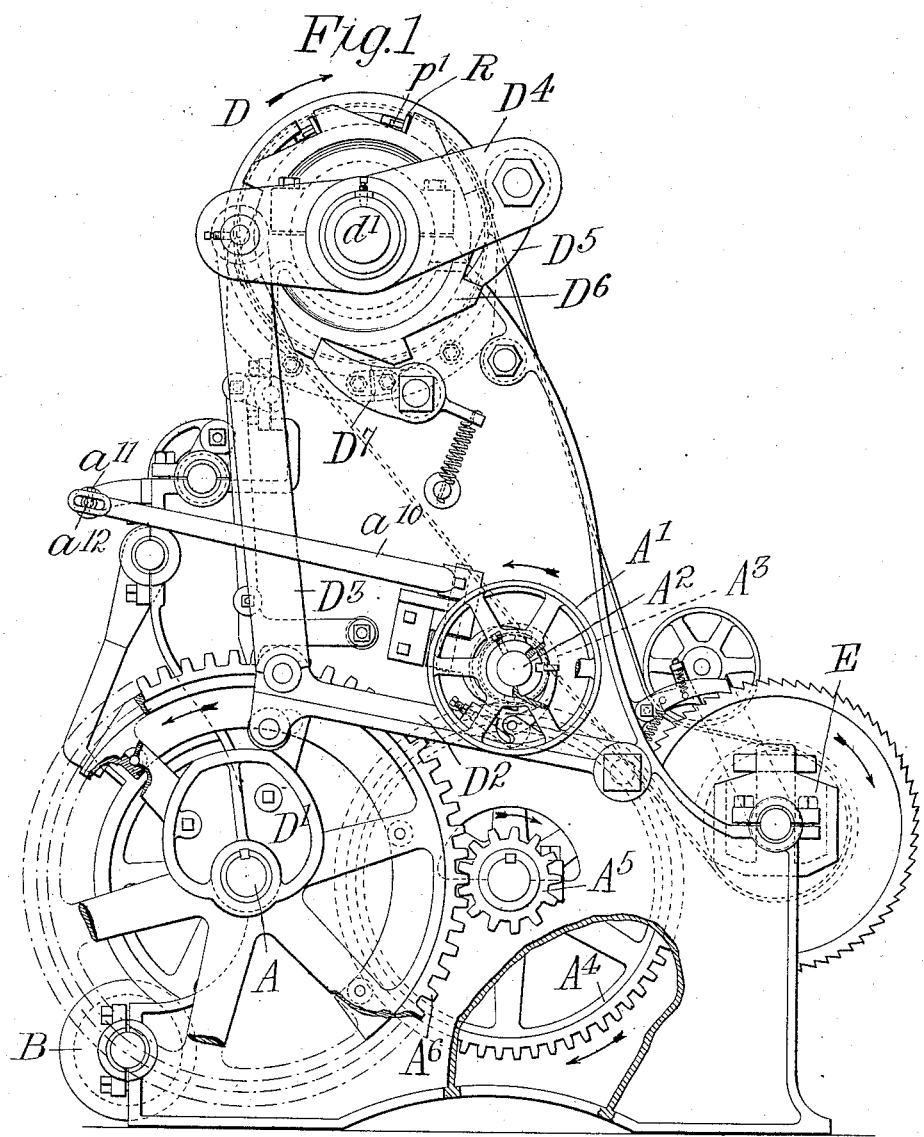

P. A. & W. V. REID.
CLAMP DRUM FOR WIRE FENCE MACHINES.
APPLICATION FILED FEB. 29, 1912.

1,047,565.

Patented Dec. 17, 1912.

6 SHEETS—SHEET 1.

P. A. & W. V. REID.
CLAMP DRUM FOR WIRE FENCE MACHINES.
APPLICATION FILED FEB. 29, 1912.

1,047,565.

Patented Dec. 17, 1912.

6 SHEETS—SHEET 2.

P. A. & W. V. REID.
CLAMP DRUM FOR WIRE FENCE MACHINES.
APPLICATION FILED FEB. 29, 1912.

1,047,565.

Patented Dec. 17, 1912.

6 SHEETS—SHEET 3.

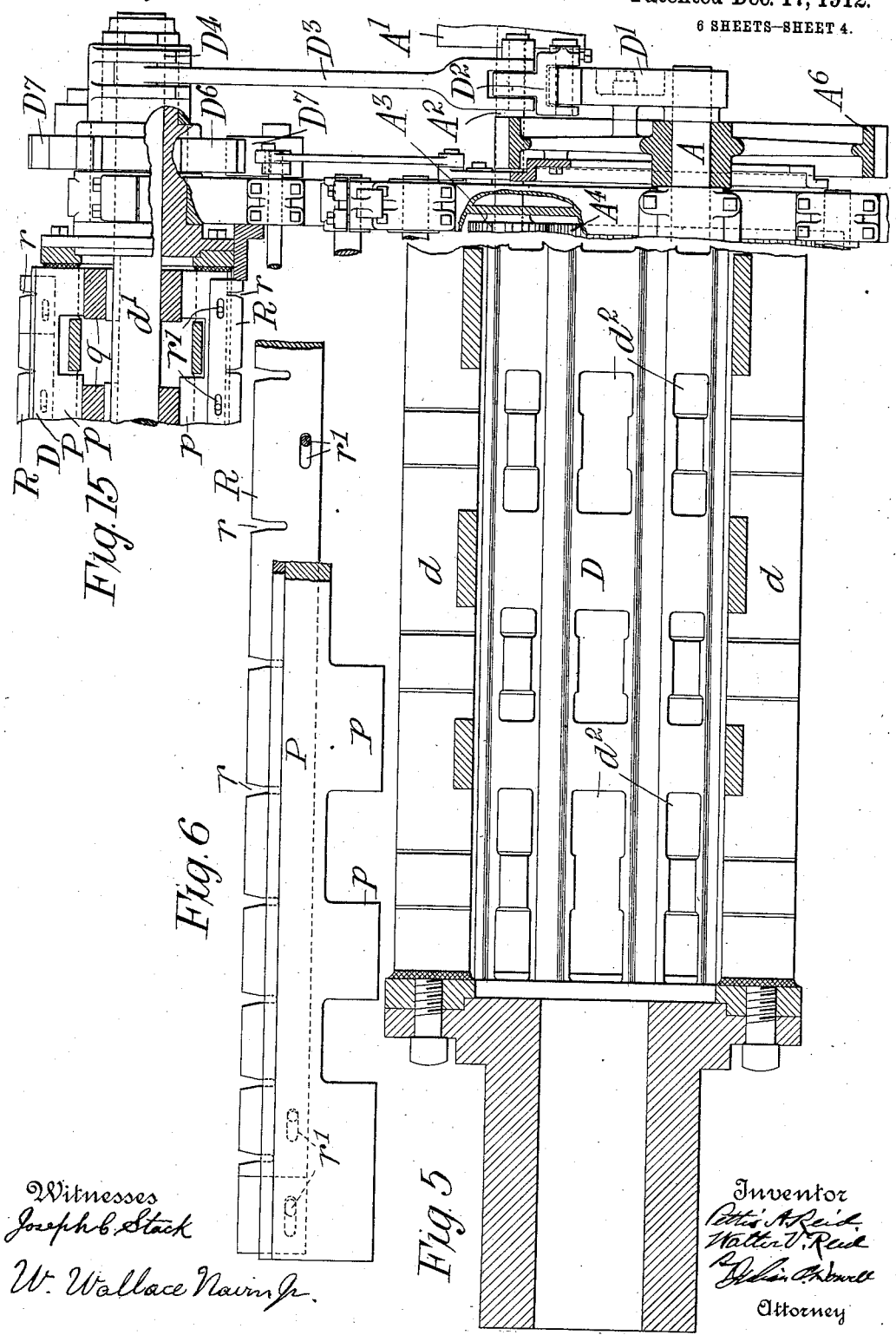

P. A. & W. V. REID.
CLAMP DRUM FOR WIRE FENCE MACHINES.
APPLICATION FILED FEB. 29, 1912.
1,047,565.
Patented Dec. 17, 1912.
6 SHEETS—SHEET 5.
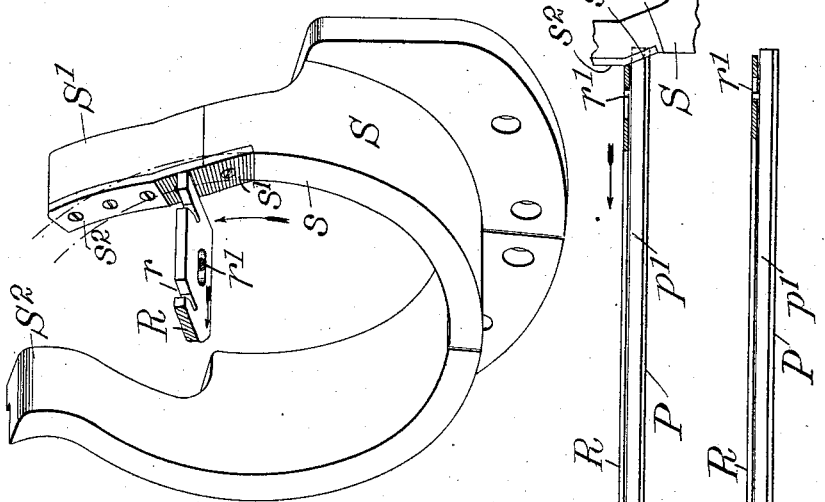
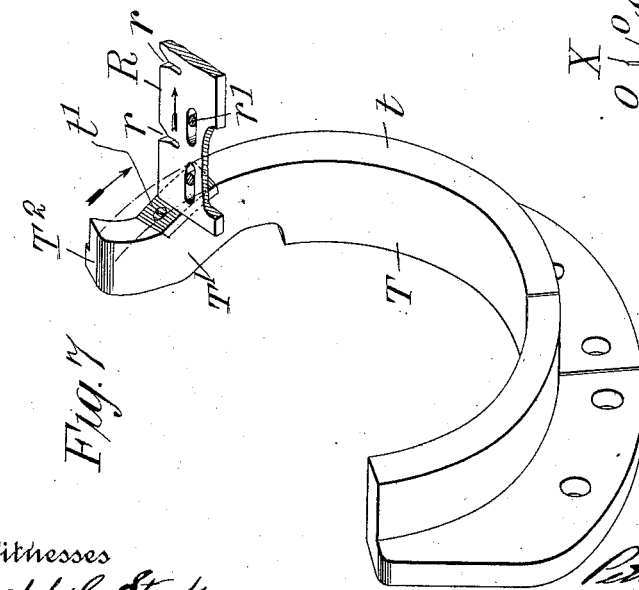
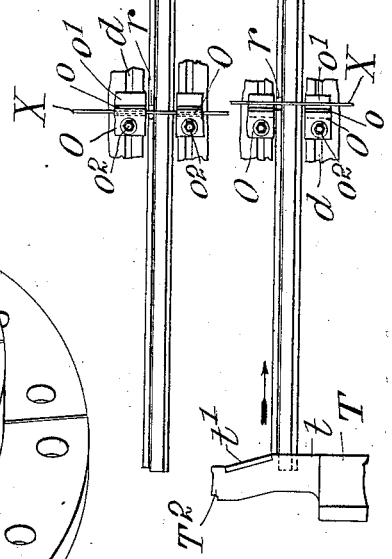

P. A. & W. V. REID.
CLAMP DRUM FOR WIRE FENCE MACHINES.
APPLICATION FILED FEB. 29, 1912.
1,047,565.
Patented Dec. 17, 1912.
6 SHEETS—SHEET 6.
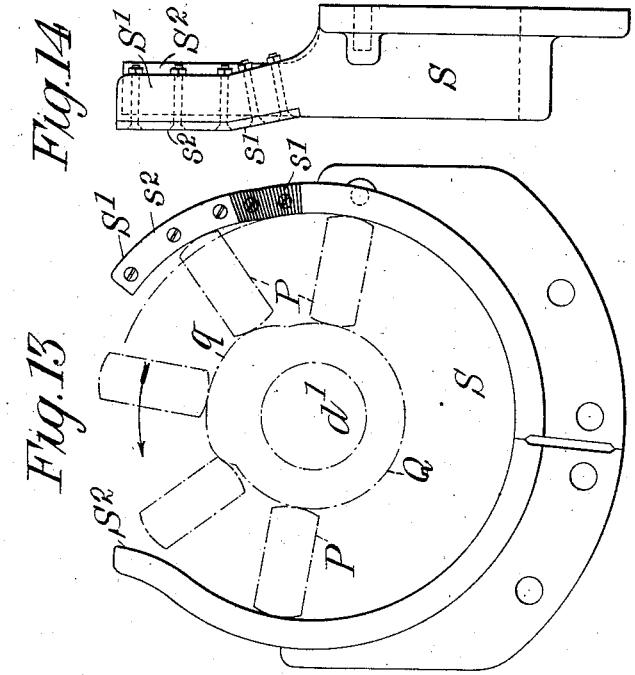
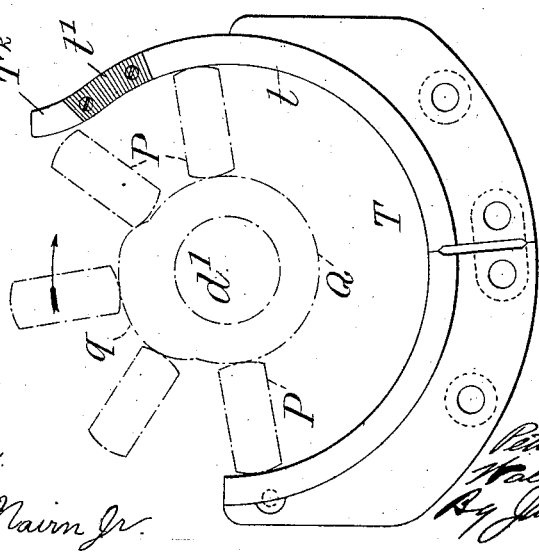
Witnesses
Joseph C. Stack.
W. Wallace Nairn Jr.
Inventor
Pettis A. Reid
Walter V. Reid
By Julius C. Dowell
Attorney

UNITED STATES PATENT OFFICE.

PETTIS A. REID AND WALTER V. REID, OF RICHMOND, INDIANA; SAID WALTER V. REID ASSIGNOR TO SAID PETTIS A. REID.

CLAMP-DRUM FOR WIRE-FENCE MACHINES.

1,047,565. Specification of Letters Patent. Patented Dec. 17, 1912.

Original application filed July 3, 1908, Serial No. 441,815. Divided and this application filed February 29, 1912. Serial No. 680,768.

*To all whom it may concern:*

Be it known that we, PETTIS A. REID and WALTER V. REID, citizens of the United States, residing at Richmond, in the county of Wayne and State of Indiana, have invented certain new and useful Improvements in Clamp-Drums for Wire-Fence Machines; and we do hereby declare the following to be a full, clear, and exact description of the invention, such as will enable others skilled in the art to which it appertains to make and use the same.

This invention relates to machines for manufacturing wire fabric or fencing, more particularly square mesh fencing composed of longitudinal wires or strands with attached cross-wires or stays.

The primary object of the invention is to provide an improved clamp-drum for pulling or feeding the fabric and incidentally crimping the strands; the present improvement as shown in the accompanying drawings being applied to a fence machine of the construction illustrated in the drawings of our application Serial No. 441,815, filed July 3, 1908, of which this application is a division; and so much of said fence machine being illustrated herein as is deemed necessary for the purposes of such illustration.

The invention will first be hereinafter more particularly described, with reference to the accompanying drawings, which are to be taken as a part of this specification, and then pointed out in the claims at the end of the description.

Figure 2:
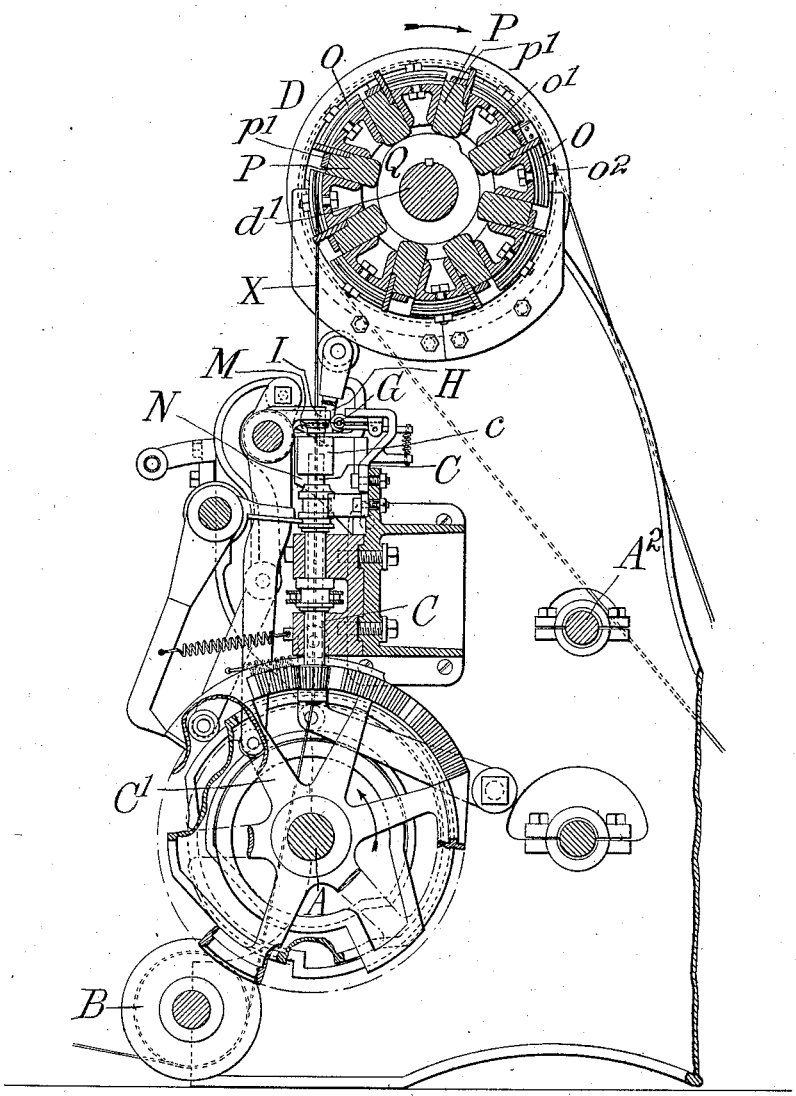
Figure 3:
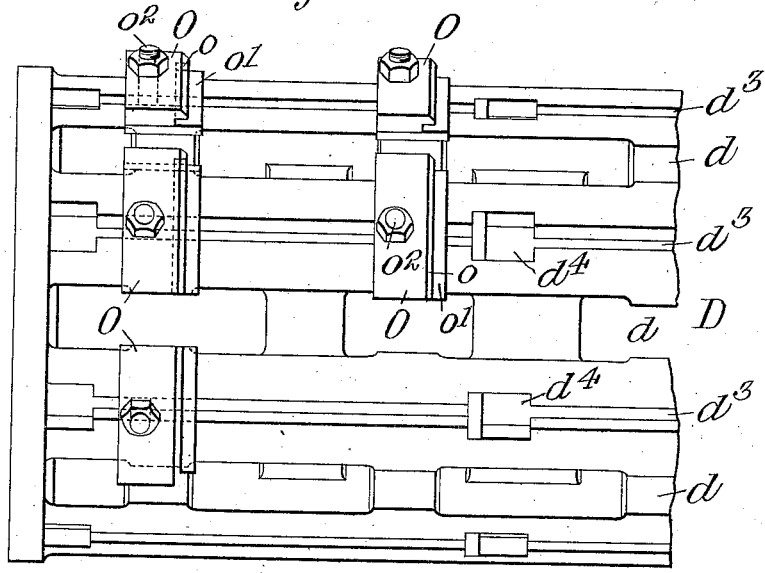
Figure 4:
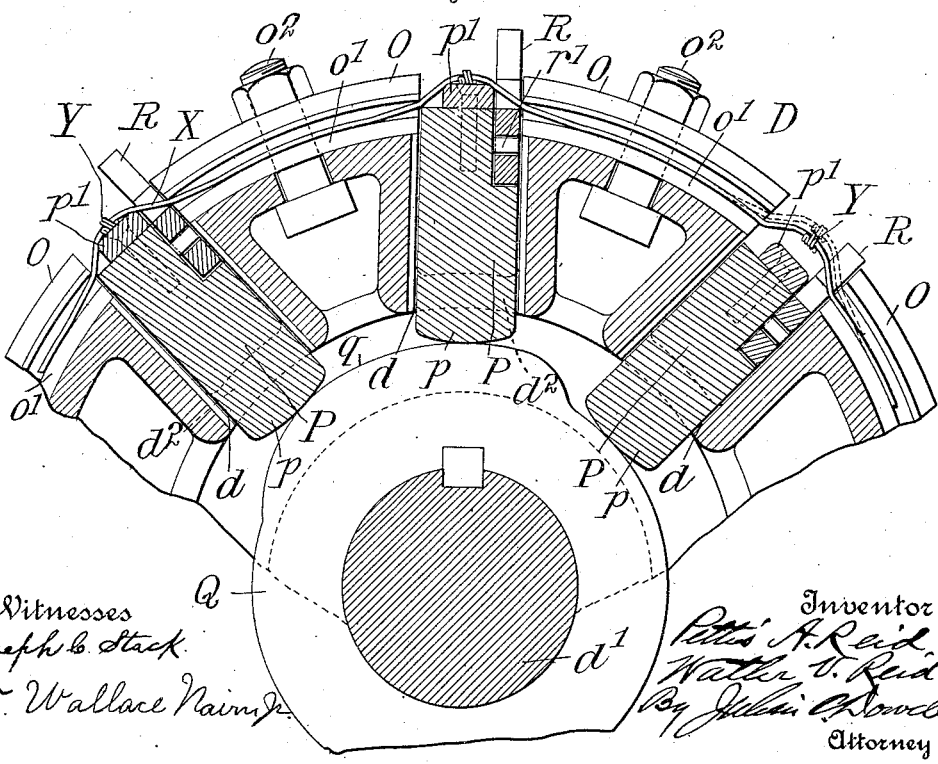

In said drawings Figure 1 is a right-hand side elevation of the fence-machine; Fig. 2 is a vertical section of the machine; Fig. 3 is a top view of a section of the clamp-drum, with parts omitted; Fig. 4 is a transverse section through a sector of the drum; Fig. 5 is a horizontal section of a part of the drum; Fig. 6 is a front view of a part of one of the crimp-bars and its tracker-bar; Fig. 7 is a perspective view of the left-hand tracker-cam, showing how the tracker-bar which is revolving in the direction indicated by the arrow is shoved endwise toward the right; Fig. 8 is a perspective view of the right-hand tracker-cam, showing how the tracker-bar is shoved endwise toward the left; Fig. 9 is a plan view representing a portion of a strand-wire and adjacent crimp-lugs, and showing one crimp-bar with its tracker-bar, and a fragment of the right-hand tracker-cam which has shoved the tracker-bar toward the left and thereby carried the strand-wire under said crimp-lugs; Fig. 10 is a similar view showing a fragment of the left-hand tracker-cam which has shoved the tracker-bar toward the right and thereby carried the strand-wire from under said crimp-lugs; Fig. 11 is a face view of the left-hand tracker-cam, with dotted lines indicating some of the crimp-bars and the cam for moving said crimp-bars radially outward; Fig. 12 is a rear elevation of said left-hand tracker-cam; Fig. 13 is a view similar to Fig. 11 of the right-hand tracker-cam; Fig. 14 is a front elevation of said right-hand tracker-cam; Fig. 15 is a detail sectional elevation of a portion of the mechanism for operating the drum.

As shown in Figs. 1 and 2, two upright housings or standards, constituting the sides of the machine-frame, support therebetween the fabric-weaving, feeding and reeling mechanisms, and provide bearings for transverse shafting, including a main drive shaft A. At the lower front of the machine are a series of shive-wheels B, fixed on a common shaft so as to turn in unison. The strand-wires, coming from any suitably arranged number of supply-spools (not shown), are first passed around or caused to encircle the shive-wheels, for the purpose of guiding and tensioning said wires against the pull of the revoluble clamp-drum. Above the shaft A, at the front of the machine, are the vertically-disposed twister-spindles C of the fabric-weaving mechanism, through which the strand-wires are threaded, and by means of which the stays or cross-wires are successively affixed to the strands. (See Fig. 2). In the type of weaving mechanism herein selected for illustrating our invention, the stays are supplied by successively feeding and cutting a continuous stay-feed-wire, which is fed across the strands by coacting feed-rolls mounted at one side of the machine; said stay-feed-wire being fed through an alined series of separable guide-tubes G, from which it is removed and placed adjacent to the strands by a number of pusher-arms H, and then pressed and held against the faces of the twisters or coilers by a series of beaters I. The fabric is drawn over the revoluble clamp-drum D, which is the subject of this division, and which is mounted at the top of the machine, above the fabric-weaving mechanism. This drum is provided with devices for gripping the strands, enabling it to pull up the fabric as the stays are successively applied, thus intermittently feeding the strands, and said gripping devices also serve to crimp the strands, as hereinafter described. At the back and base of the machine is the winding-reel E, to which the fabric passes from the clamp-drum D, and by means of which it is wound into a bundle or roll.

As shown in Fig. 1, power is applied by a belt (not shown) at pulley $A^1$ on the power-shaft $A^2$ and is transmitted by pinion $A^3$, gear $A^4$, pinion $A^5$ and gear $A^6$ to the main drive-shaft A, which directly or indirectly operates the several mechanisms of the machine. Control of power, enabling the operator to start and stop the machine instantly, is provided by a clutch in connection with pulley $A^1$ and a clutch-controlling lever $a^{10}$, whereby the pulley may be locked to the shaft or permitted to run free thereof. The free end of said lever is shown connected by a pivot-bolt $a^{11}$ to a shift-bar $a^{12}$ arranged at the front of the machine. By this means, the operator can conveniently control the power from either side or at any position along the front of the machine, by shifting the bar or rod $a^{12}$. Shaft A operates the coiler-spindles C by means of a series of drive-wheels $C^1$ (Fig. 2), and also operates, by means of cams, other instrumentalities associated with or forming part of the fabric-weaving mechanism, including the stay-wire positing devices and cutters. At one side of the machine (Fig. 1), shaft A communicates intermittent motion to the clamp-drum D, by means of a cam $D^1$ on said shaft. Said cam $D^1$ controls a lever $D^2$, carrying a roller which rests on said cam; and said lever $D^2$ is connected by a link $D^3$ to a dog-carrying lever $D^4$ loosely mounted on the drum-shaft. As rocking motion is thus imparted to the lever $D^4$, the drum D is revolved step by step by the dog $D^5$ engaging a ratchet-wheel $D^6$ on one of the drum journals. The drum is prevented from reverse turning by a spring-controlled detent or pawl $D^7$. At the opposite side of the machine, the drum-journal is provided with a pulley from which motion is communicated by a suitable belt to a second and smaller pulley on the shaft of a reel E, whereby the reel will be driven from the drum D but at a higher speed, so as to wind the fabric and pull it taut as fast as it is delivered from the drum. We preferably provide a slip-tension device to act upon the belt and permit the drum to vary its rotation to compensate for the increasing diameter of the roll or bundle thereon, reverse rotation of the drum being prevented by a conveniently arranged pawl-and-ratchet mechanism. The strand-wires are fed step-by-step by the intermittently revolving clamp-drum while the stay-supply-wire is fed intermittently across the strands, these operations being preferably timed to occur simultaneously, leaving the interim for the stay-attaching operation.

The clamp-drum D, over which the fabric passes to the reel E, pulls or draws up the fabric intermittently, thus imparting a uniform step-by-step feed, while the reel E winds the fabric only so fast as it is paid out by the drum, the rotation of the reel being variable as the roll thereon increases in diameter, as previously pointed out. Said drum D is of the following construction: It comprises a hollow shell having longitudinal channels $d$ alternating with rows of crimp-lugs O which are mounted on the surface of the drum between said channels. As a preferred structure, the said shell comprises concentric cylinders united by longitudinal web-portions which constitute the walls of the channels $d$, so that the channels alternate with hollow portions of substantially trapezoidal cross-section, as shown more clearly in Fig. 4. The crimp-lugs O are or may be attached on the surface of such intermediate portions by bolts $o^2$. The crimp-lugs O are arranged in both annular and longitudinal rows; that is to say they are alined both longitudinally and circumferentially of the drum. As shown in Figs. 3 and 4, they consist of segmental blocks formed with undercut sides, leaving overhanging ledges having beveled edges $o$. In the present illustration the under-cuts are formed in the right-hand sides of the lugs. The annular rows of these crimp-lugs are so placed that the taut strand-wires passing over the drum will lie between said rows and adjacent, or approximately so, to the under-cut sides. The lugs are desirably mounted on segmental wearing plates $o^1$ preferably of hardened steel, of which material the lugs may likewise be made. Fitted in the longitudinal channels $d$ of the clamp-drum are radially-movable crimp-bars P, each having a plurality of inwardly projecting lugs $p$ which extend through the openings $d^2$ in the bottoms of the channels $d$ and ride, respectively, upon a number of stationary cams Q keyed on the drum-shaft $d^1$; it being noted that the heads of the drum are journaled to revolve on said shaft.

The bulges $q$ on the cams Q are preferably arranged to move the crimp-bars P radially outward as they approach to the uppermost position of their orbit, and to allow them to drop inwardly just after they have started on the downward turn, as will be seen in Fig. 4. The crimp-bars are provided on their outer faces with hardened steel crimp-strips $p^1$ which normally lie approximately even with the cylindrical surface of the wearing plates $o^1$ under the crimp-lugs O. Attached to the crimp-bars P are notched tracker-bars R, the notches $r$ thereof being alined circumferentially of the drum and spaced to receive and guide the strand wires X. These tracker-bars, which project above the cylindrical surface of the drum, are shown fitted in rabbets in the rear faces of the crimp-bars, and are attached by pin-and-slot connections $r^1$ which permit the tracker-bars to have a limited end-wise movement. (Figs. 4 and 6.) At opposite ends of the clamp-drum, stationary tracker-cams S and T are affixed to the inner sides of the machine-frame. These tracker-cams comprise semi-annular members supporting the ends of the crimp-bars P for the lower half of the drum, while the confronting surfaces $s$ and $t$ of said tracker-cams constitute segmental tracks which contact with the opposite ends of the tracker-bars R, as shown in Figs. 7 to 10 and 15. The segmental track $s$ of the right-hand tracker-cam S has an incline at $s^1$ adapted to shove the tracker-bars toward the left, and a terminal surface $s^2$ to maintain the tracker-bars in their shifted position. This surface $s^2$ is provided on a front extension $S^1$ of the tracker-cam which is made on an increased radius, as seen in Fig. 13, to allow for the radially-outward movement of the crimp-bars P, as they ride on the bulge of the cams Q. The segmental track $t$ of the left-hand tracker-cam T has an incline at $t^1$, provided on a rear extension $T^1$, adapted to shove the tracker-bars toward the right.

It is noted by reference to Figs. 7, 8, 11 and 13 that the surfaces $s^1$ and $s^2$ of the tracker-cam S occur at the front upper quarter of the orbit of the tracker-bars, while the surface $t^1$ of the tracker-cam T occurs at the rear upper quarter; said surfaces $s^1$ and $t^1$ being respectively arranged to shift the tracker-bars in opposite directions before and after the crimp-bars are raised and lowered by the cams Q. Both tracker-cams are preferably also provided with rear curved or inclined extensions $S^2$, $T^2$, adapted to insure the return or inward-radial movement of the crimp-bars P after they have passed off the bulges of the cam Q; though this is not essential since the tension on the fabric passing over the reel will force the crimp-bars inward.

In operation, as the fabric is drawn over the drum (the strands being taut by virtue of the pull exerted by the winding-reel), the strand-wires X are engaged in the notches $r$ of the tracker-bars R and lie between the annular rows of crimp-lugs O, while the stays Y will come over the crimp-bars or between the longitudinal rows of crimp-lugs. The beveled edges $o$ of the over-hanging ledges of the crimp-bars serve as sheds to insure that the taut strand-wires X will drop down upon the wearing plates $o^1$ in case any one or more of such wires should have a tendency to lodge upon said ledges, that is, if any of the wires should become slightly disalined. As the drum revolves, each crimp-bar P is in turn forced outward by the cams Q, but before it is so operated its tracker-bar R is shoved end-wise in one direction (to the left) by the incline $s^1$ of the tracker-cam S (Figs. 8 and 9); and thus the strands X are carried and held under the over-hanging ledges $o$ of the two rows of crimp-lugs O on opposite sides of the particular crimp-bar. While so held, the crimp-bar is forced outward and thus clamps or grips the strands, at the same time crimping them, as shown in Fig. 4. It is desirable that the strands should always be gripped or clamped by at least two crimp-bars. As each crimp-bar passes off the bulges of the cams Q, thus releasing the strands X from the corresponding crimp-lugs, its tracker-bar R is shoved end-wise in the opposite direction (to the right) by means of the incline $t^1$ of the tracker-cam T (Figs. 7 and 10), and thereby the strands are moved from under the under-cut crimp-lugs. This is timed to occur sufficiently in advance of the point where the strands leave the drum, on passage to the reel, to avoid catching under the crimp-lugs by the off-going lengths of the strands. The tension of the wires on the crimp-bars P forces them inward when they pass the bulges of the cam Q, and this inward motion of the crimp-bars is insured by the inclines $S^2$, $T^2$ of the tracker-cams; so that in the lower half of the drum the crimp-bars will be supported by the semi-annular tracker-cams, as shown in Fig. 6.

The action of the tracker-cams is illustrated in Figs. 7 to 10, inclusive. In Fig. 8, one of the tracker-bars R is shown at that point of its orbit just before the crimp-bar P to which it is attached is moved radially outward by the cams Q. The right-hand end of the tracker-bar is riding on the incline $s^1$, which thus shoves the strand X under the ledges of the crimp-lugs O, as indicated in Fig. 9. When the end of the tracker-bar reaches the surface $s^2$, which will hold the tracker-bar to its shifted position, the crimp-bar P will be raised by the cams Q, the increasing radius of the extension $T^1$ accommodating this outward radial movement of the crimp-bar as shown in Fig. 13. In Fig. 7, the tracker-bar is shown at that point of its orbit when the crimp-bar has passed off the bulges of the cam Q and when the tracker-bar is being shoved toward the right by the incline $t^1$ of the tracker-cam T, so as to move the strand X from under the crimp-lugs as indicated in Fig. 10. The arrows in Figs. 8 and 13 indicate the direction of revolution of the drum relative to the right-hand tracker-cam, and the arrows in Figs. 7 and 11 indicate the direction of revolution relative to the left-hand tracker-cam; while the arrows in Figs. 9 and 10 indicate the directions in which the tracker-bar is shifted by the opposite tracker-cams.

It will be seen that the fabric is always clamped by the revolving drum, drawing the strands taut from the shive-rolls B, and the strands are crimped at the connections of the stays, or at the stays and intermediate points, according to the length of intermittent feed of the strands, which depends upon the diameter and angular speed of the drum. The crimp-bars P constitute radially movable clamp-jaws coacting with the stationary rows of clamp-jaws provided by the under-cut crimp-lugs O.

The peripheral motion of the clamp-drum D at each intermittent turn or rotation may be equal to the distance from one crimp-bar to another, or it may be twice that distance, or other desired multiple thereof, according to the spacing desired for the stays. In the first case, the stays will come over each crimp-bar, and the strands will be crimped at the stays, while in the second case the stays will come at alternate crimp-bars and the strand will be crimped at the stays and also between adjacent stays.

It is noted that the drum D is longitudinally slotted as indicated at $d^3$, and the fastening bolts $o^2$ which attach the crimp-lugs O are inserted through the longitudinal slots in the drum as shown in Fig. 3, thus providing for lateral adjustment of the clamp-devices of the drum to accord with the lateral adjustment of the twisters provided by means of the slotted bed-plate (not shown). The longitudinal slots $d^3$, in the drum have enlarged spaces $d^4$ at intervals for insertion of the heads of the bolts to engage the bolts in the slots $d^3$.

To summarize the operation: As the clamp-drum D intermittently revolves, the fabric being clamped thereon, the taut strands X are pulled up intermittently through the twister-spindles C, and the feed-rolls feed the wire for the stay Y across the strands, through the separable guide-tubes G; and said wire Y is then displaced from said guide-tubes and pressed against the strands and upon the faces of the twister-heads $c$ by the pusher-arms H and beaters I. During the interval of rest of the wires, the progressively-operating series of twisters attach the stay, by forming intermediate loops in the wire Y and twisting said loops around the intermediate strands, and also twisting the ends of the stay around the marginal strands; the cutters M and N severing the wire Y into two stays. The attached stay is pulled up by the next feed, and in due time reaches the drum D which crimps the strands at the knots or connections of the stay.

We do not intend to restrict ourselves to the specific details of construction and arrangement herein shown and described since the same may be modified in various ways within the scope of this invention.

Having thus described our invention, what we claim as new and desire to secure by Letters Patent is:

1. In a wire-fence machine, an intermittently-rotating clamp-drum, and driving connections therefor from a continuously-rotating shaft including a ratchet-wheel and rocking dog-carrying lever.

2. The combination of the rotary clamp-drum, a ratchet-wheel attached to the drum, a rocking lever mounted on the drum-shaft and carrying a dog engaging said ratchet-wheel, and means for operating said lever.

3. The combination with a rotary clamp-drum, the ratchet-wheel $D^6$ and dog-carrying lever $D^4$, of the drive-shaft, cam $D^1$ thereon, lever $D^2$ controlled thereby, and link $D^3$ connecting said levers.

4. The revoluble clamp-drum having longitudinal slots, and laterally-adjustable clamp-members mounted in longitudinal and annular rows on said drum, and fastenings therefor inserted through said slots.

5. In a wire-fabric machine, a revoluble clamp-drum having annular rows of jaws, and radially-movable jaws coacting therewith, and means for operating said radially-movable jaws for alternately gripping and releasing the wires passing over said drum.

6. In a wire-fabric machine, a revoluble clamp-drum having two coöperating sets of jaws arranged in annular rows, and means for working the jaws of one set radially for alternately gripping and releasing the wires passing over said drum.

7. A revoluble clamp-drum having annular rows of overhanging or undercut lugs between which rows the wires pass over the drum, means for effecting relative radial movement between those parts of the surface of the drum which support the wires and the lugs, when the wires are under the latter, for gripping and releasing the wires, and means for effecting lateral displacement of the wires relative to said lugs for bringing them in relative position for gripping and for allowing escape of the wires when released.

8. A revoluble clamp-drum having overhanging or undercut lugs arranged in longitudinal and annular rows, between which annular rows the wires pass over the drum, intermediate longitudinal rows of supports for the wires with which said lugs coöperate when the wires are under them, means for effecting relative radial movement between said lugs and supports for gripping and releasing the wires, and means for effecting relative lateral movement between the lugs and wires for bringing them in relative position for gripping and for allowing escape of the wires when released.

9. A revoluble clamp-drum having overhanging or undercut lugs arranged thereon in longitudinal and annular rows, radially-movable bars arranged between the longitudinal rows of lugs, means whereby the wires passing over said drum are moved laterally under said lugs, and means for operating said bars for gripping and releasing the wires, and means whereby the wires when released are caused to escape said lugs.

10. A revoluble clamp-drum having overhanging or undercut lugs arranged thereon in longitudinal and annular rows, longitudinally-shiftable bars arranged between the longitudinal rows of lugs, said bars having means for engaging the wires passing over the drum, means for shifting said bars in opposite directions to carry the wires under and from under said lugs, and radially-movable members and means for operating them to grip and release the wires while under said lugs.

11. A revoluble clamp-drum having overhanging or undercut crimp-lugs arranged in longitudinal and annular rows, radially-movable crimp-bars between the longitudinal rows provided with guides for the wires between the annular rows, and means for effecting relative lateral shift between said lugs and guides to bring the lugs over and off the wires before and after crimping.

12. A revoluble clamp-drum having undercut crimp lugs arranged in longitudinal and annular rows, crimp bars between the longitudinal rows, tracker-bars associated with the crimp-bars and movable endwise for bringing the wires under and from under the crimp-lugs, and means for effecting relative radial motion between the crimp-lugs and crimp-bars for gripping and releasing the wires.

13. A revoluble clamp-drum having overhanging or undercut crimp-lugs arranged in longitudinal and annular rows, intermediate longitudinal crimp bars provided with guides for the wires between the annular rows, means for effecting relative lateral shift between said lugs and guides to bring the wires under and from under the lugs, and means for effecting relative radial movement between the crimp bars and lugs for gripping and releasing the wires.

14. A revoluble clamp-drum having longitudinal channels, undercut or overhanging crimp-lugs arranged in longitudinal rows between said channels and arranged also in annular rows, radially-movable bars in said channels, endwise shiftable notched bars slidably-connected to said radially-movable bars, means for shifting said notched bars in opposite directions to move the wires engaged thereby under and from under said lugs, and stationary cams in said drum for operating said radially-movable bars and adapted to move them outward while the wires are under said lugs.

15. The combination of a hollow drum having longitudinal channels, radially-movable bars on said channels having inwardly-projecting lugs, stationary cams in said drum with which said lugs contact, undercut or overhanging crimp-lugs mounted on the drum between said channels and arranged in annular rows, endwise shiftable notched bars slidably-connected to said radially-movable bars, and means for shifting said notched bars in opposite directions.

16. The hollow-drum D having radial channels and made as an integral structure in the form of outer and inner cylinders united by web-portions constituting the side-walls of said channels, providing hollow portions of trapezoidal cross-section alternating with the said channels, substantially as and for the purposes described.

17. A clamp-drum having undercut crimp-lugs mounted thereon in longitudinal and annular rows, coöperating devices for shifting the wires which pass over said drum to lodge them under said crimp-lugs and to crimp them intermediately, and for releasing said wires before they pass from the drum.

18. A clamp-drum having undercut crimp-lugs mounted thereon in longitudinal and annular rows, coöperating devices for shifting the wires which pass over said drum to lodge them under said crimp-lugs and to crimp them intermediately, and for releasing said wires before they pass from the drum, said crimp-lugs having their overhanging ledges beveled to shed the wires, substantially as described.

19. In combination with a clamp-drum having radially-movable wire-clamping bars and endwise movable tracker-bars, tracker-cams at opposite ends of the drum adapted to support the ends of said radially-movable bars and providing segmental tracks for the ends of the tracker-bars, said tracks having inclines for shifting said tracker-bars in opposite directions at different phases of revolution.

In testimony whereof we affix our signatures, in presence of witnesses.

PETTIS A. REID.
WALTER V. REID.

Witnesses:
A. M. GARDNER,
MARY ALICE REID,
THOMAS E. KINSEY.

Copies of this patent may be obtained for five cents each, by addressing the "Commissioner of Patents, Washington, D. C."